June 2, 1970  S. A. SHERMAN ET AL  3,515,869
MASS SPECTROMETER EXPONENTIAL ELECTROMAGNETIC SCANNING
ARRANGEMENT PROVIDING FOR AUTOMATIC DISCHARGE OF
THE SCANNING MAGNET COIL
Filed May 2, 1967  4 Sheets-Sheet 1

INVENTORS.
Stanley A. Sherman
Edward B. Delany
BY
Frank J. Thompson
ATTORNEY.

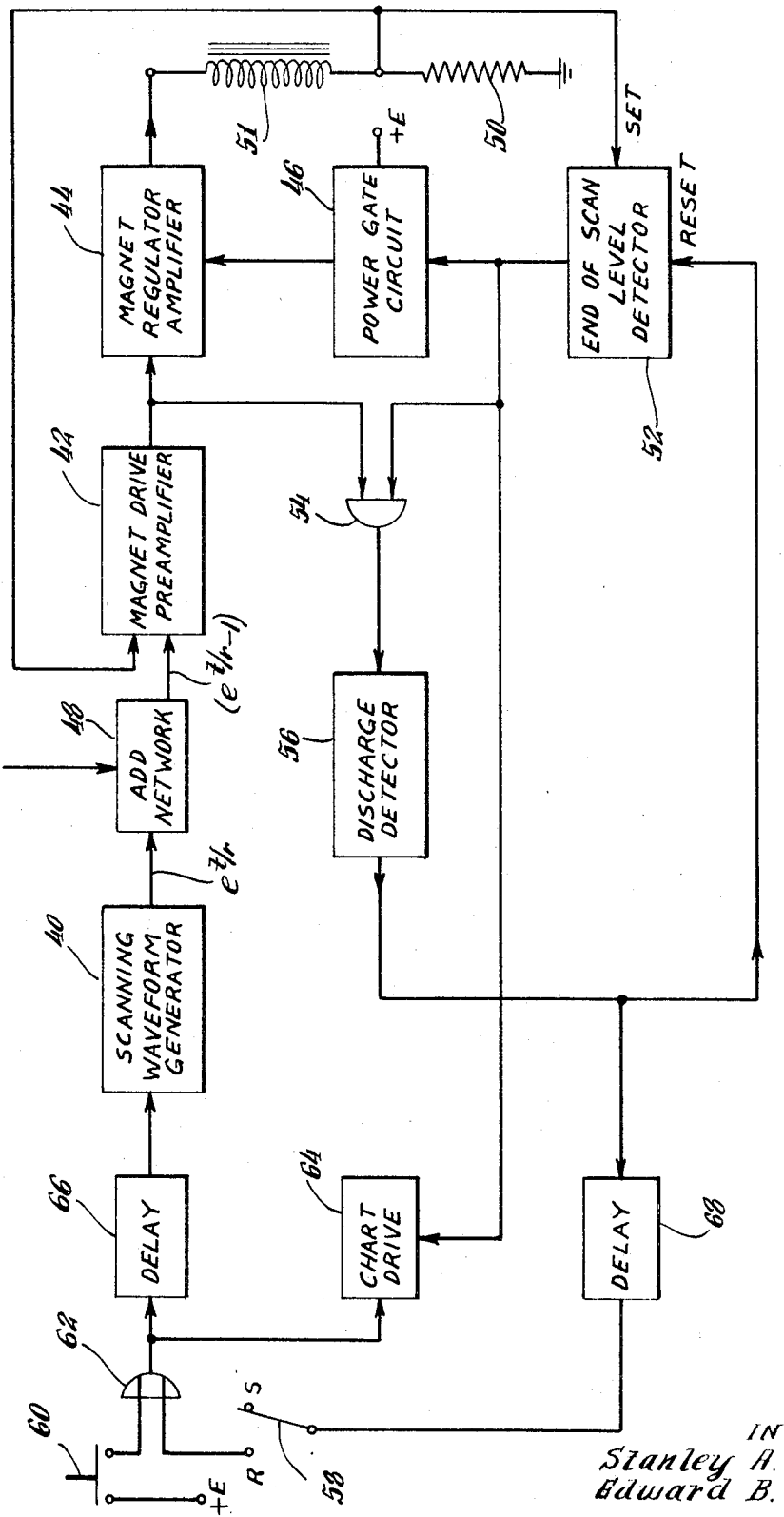

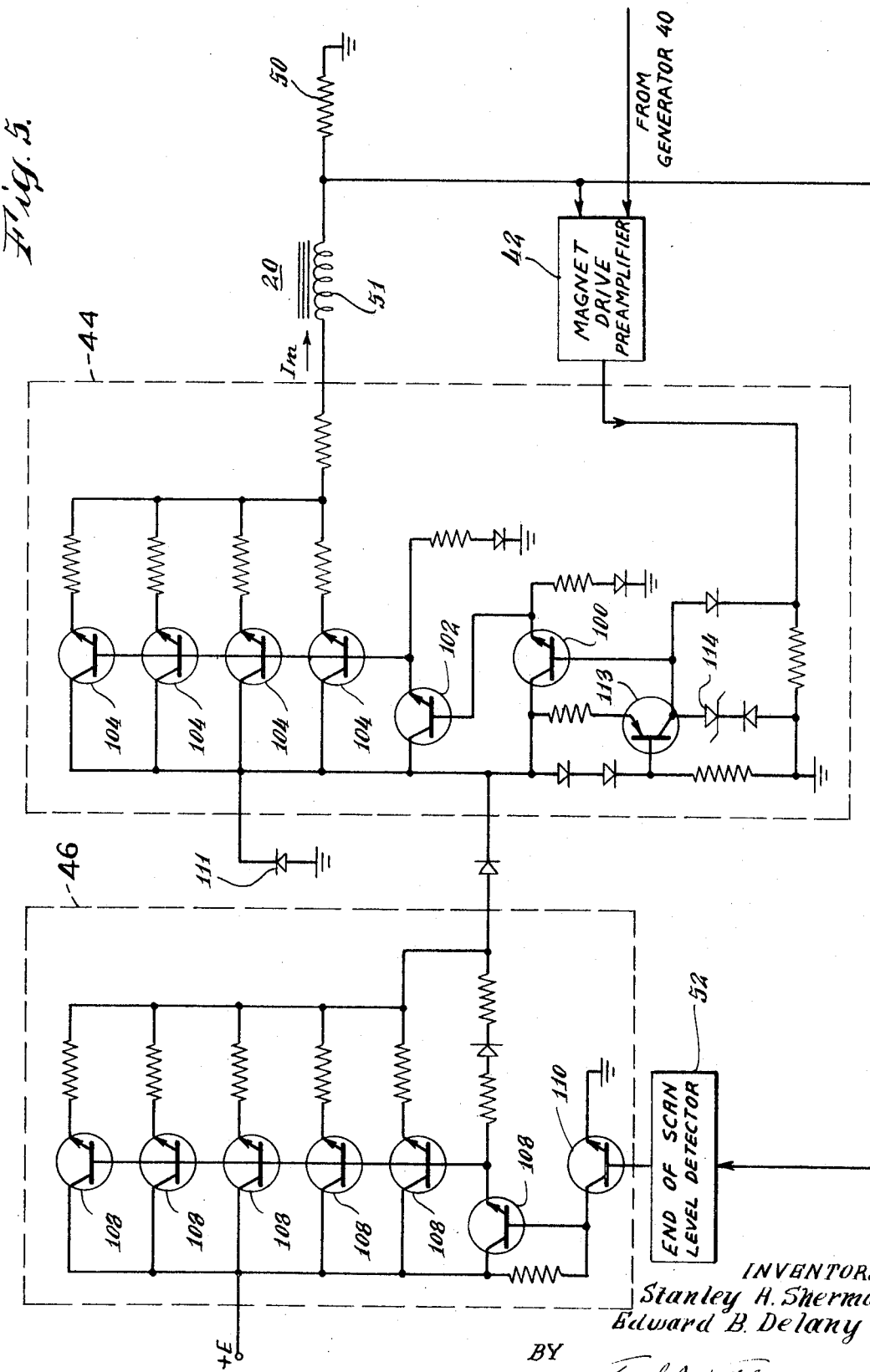

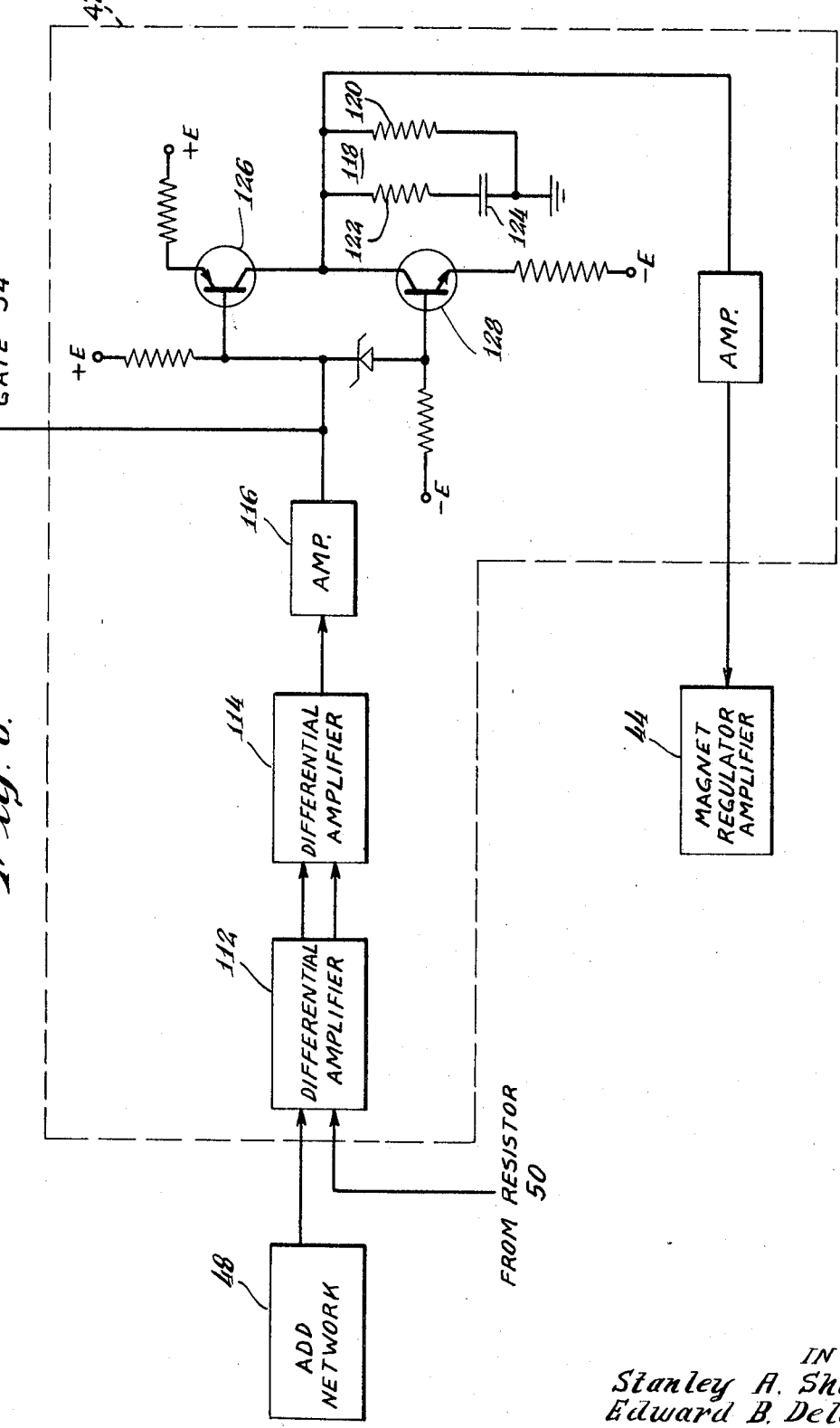

United States Patent Office

3,515,869
Patented June 2, 1970

3,515,869
MASS SPECTROMETER EXPONENTIAL ELECTROMAGNETIC SCANNING ARRANGEMENT PROVIDING FOR AUTOMATIC DISCHARGE OF THE SCANNING MAGNET COIL
Stanley Allen Sherman, Danbury, and Edward Bernard Delany, Ridgefield, Conn., assignors to The Perkin-Elmer Corporation, Norwalk, Conn., a corporation of New York
Filed May 2, 1967, Ser. No. 635,987
Int. Cl. B01d 59/44; H01j 39/36
U.S. Cl. 250—41.9      9 Claims

ABSTRACT OF THE DISCLOSURE

A magnetic field scanning arrangement for a mass spectrometer includes an operational integrating amplifier circuit means for generating a scanning voltage having a waveform of the function $e^{t\tau}-1$. Circuit means couple the waveform generating means to a magnet coil driver circuit arrangement for causing the flow of a scanning current in accordance with this function. The magnet coil driver circuit is additionally adapted for functioning as a rapid energy discharge network during the discharge interval of the magnet scan cycle. A power gate functions in response to a predetermined scan current level for interrupting current to the driver circuit during a retrace interval.

---

This invention relates to mass spectrometry. The invention relates more particularly to an improved scanning arrangement for mass spectrometers.

Mass spectrometers include an ionizing section wherein a sample under investigation is ionized, and formed into a beam, and, an analyzing section wherein the ions are subsequently accelerated through a magnetic field toward an aperture in a collector plate. In one form of a spectrometer, separation of ions based on mass is accomplished by providing a time varying magnetic field. The accelerated ions are scanned across the output plate aperture in accordance with their mass and with the intensity of the time varying field to thereby generate a mass spectrum.

It is an object of the present invention to provide an improved circuit arrangement for magnetic scanning in a mass spectrometer.

Deflection of ions of higher order mass requires a relatively intense magnetic field. For example, the time varying magnetic field may be required to scan through a range of as much as 0 to 16 kilogauss. Establishing time varying magnetic fields of this magnitude and of desired configuration necessitates electromagnet drive currents of relatively high amplitude. In general, the time constant $L/R$ of such an electromagnet is relatively large and a corresponding relatively large amount of energy stored in the field of the magnet must be discharged prior to initiating a successive scan. It is desirable at times that this energy be discharged in a relatively short interval of time.

It is another object of this invention to provide in a mass spectrometer, an improved circuit arrangement for rapidly discharging the energy in the field of an electromagnet at the termination of a scanning cycle.

The waveform of current flowing in a winding of the electromagnet is generally linear and of positive slope. At times, it is desirable to provide a waveform which is exponential and which accurately conforms to the function $(e^{t/\tau}-1)$.

Another object of the invention is to provide in a mass spectrometer, a magnetic scanning arrangement having an improved waveform generator adapted for generating the function $(e^{t/\tau}-1)$.

In accordance with a feature of the present invention, a magnetic scanning circuit arrangement for a mass spectrometer includes an operational integrating amplifier circuit means having positive feedback for generating a scanning voltage having a waveform of the function $(e^{t/\tau}-1)$. Means including a power driver circuit arrangement couple the waveform generating means to a magnet coil during the scanning interval of the deflection cycle and decouple the generator during a discharge interval of the cycle.

In accordance with another feature of the invention, the magnet coil driver circuit is arranged for automatically functioning as an energy discharge circuit network during the discharge interval of the magnet scan cycle.

These and other objetcs and features of the invention will be apparent with reference to the following specifications and drawings wherein:

FIG. 2 is a diagram, in block form, illustrating a magnetic scanning arrangement constructed in accordance with features of the present invention;

FIG. 5 is a diagram partly in block form illustarting a magnet driver amplifier arrangement included in the scanner of FIG. 2; and FIG. 6 is a schematic diagram of a rapid recovery circuit incorporated in a preamplifier of the scanning arrangement of FIG. 2.

Figure 1:
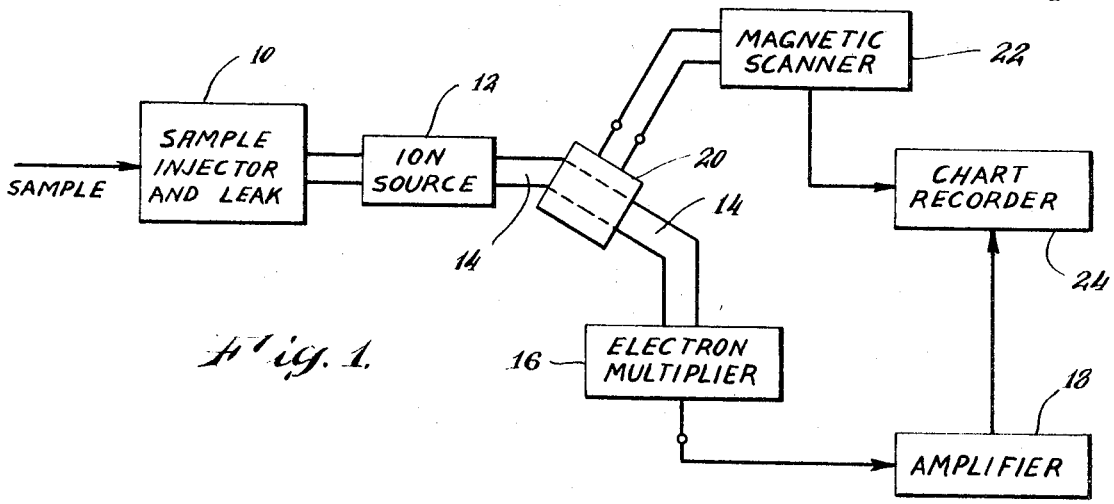
FIG. 1 is a diagram in block form illustrating the general arrangement of a magnetic scanning mass spectrometer.

Referring now to FIG. 1, the mass spectrometer shown generally in block form includes a sample injector and leak arrangement 10 and an ion source 12. As is well known, a sample is vaporized and contained in an evacuated reservoir from which the sample molecules leak into the ion source at a desired rate. The ion source operates on the molecules and generates ions therefrom. In one arrangement, the molecules are ionized by bombarding with an electron beam. Electrical accelerating potentials are provided for causing the ions to travel through an analyzing section of the spectrometer toward an apertured ion collector plate, not illustrated. The path of the traveling ions is defined by the tubulation 14. Ions passing through the collector plate aperture excite an electron multiplier 16 and the signal generated thereby is further amplified by an amplifier circuit means 18. An electromagnet 20 is positioned for establishing a field in the path of the accelerated ions. The field is of an intensity for causing mass selection of the ions. A mass spectrum is generated by causing the current in the electromagnet 20 to vary in predetermined fashion during an interval of time. The magnetic scanning unit 22 provides the coil current of desired waveform. Electrical output impulses from the amplifier 18 are applied to a chart recorder which is synchronized with the magnetic scanner 22 and a mass spectrogram is thereby generated. The operation of such a mass spectrometer is well known and further elaboration is believed unnecessary.

Figure 3:
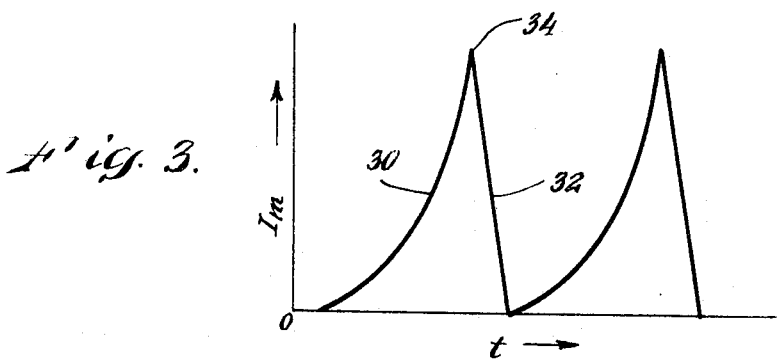
FIG. 3 is a diagram of the waveform of scanning current.

A desired magnet current waveform is illustrated in FIG. 3. In FIG. 3, wherein magnet current amplitude is plotted versus time, the charging current for the magnet corresponding to the scanning interval of the deflection cycle is indicated by the segment 30 and a discharge interval of the cycle is represented by the segment 32. As indicated previously, the exponentially rising segment 30 representing the function $(e^{t/\tau}-1)$ is desirable particularly when it is desired to minimize the bandwidth requirements of the recording system and to accurately generate mass markings on the chart recorder.

A magnetic scanning circuit arrangement 22 is illustrated in greater detail in FIG. 2. The scanner circuit arrangement includes a scanning waveform generator 40 adapted for establishing the exponential scanning waveform, and a magnet driver arrangement including a magnet drive preamplifier 42, a magnet regulator amplifier 44, and a power gate circuit 46. Although the waveform of FIG. 3 illustrates the segment 30 rising from effectively 0 current, it is desirable at times to maintain a steady or quiescent current flow in the magnet in order that the current sweep may be initiated from an elevated current level. A resistive add network 48 has therefore been provided with provision for manually establishing the initial level of current in the magnet 20 before the segment 30 of the waveform of FIG. 3 is initiated. The scanner generator 40 generates the function $e^{t/\tau}$ and the adder network adds $(-1)$ to provide a compound output signal of $(e^{t/\tau}-1)$.

Circuit means are provided for indicating when a peak 34, or other desired level of the waveform of FIG. 3 has been attained and for causing the magnet 20 to discharge to an initial level prior to the start of a successive scan segment. An impedance 50 is coupled in series with the magnet coil 51 for establishing a voltage proportional to the amplitude of the current flowing in the coil. A level detector 52 senses this voltage and at this predetermined level causes interruption in the application of power to the magnet via the power gate circuit 46. This detector 52 comprises a conventional bistable circuit provided by an SCR semiconductor device. The energy stored in the magnetic field of a magnet 20 therefore is discharged by the collapse of this field and a discharge current flows in a series path, through the magnet coil 51 and through the magnet regulator amplifier 44. When the magnet has discharged to a predetermined level, an indicating voltage is derived from the magnet drive preamplifier 42 and is applied to an and gate 54 along with a voltage from the end of scan level detector 52. An output from the and gate 54 triggers a discharge detector 56 which in turn resets the end of scan level detector stage 52, and reapplies power to the magnet regulator amplifier 44 via the power gate circuit 46. The scanner is thus conditioned to initiate another scan cycle.

The scanner circuit arrangement of FIG. 2 is adapted for single cycle operation under manual control or for repetitive automatic scanning. In the single cycle mode of operation, a contact arm 58 of a two position single throw switch is positioned at the S contact as illustrated. The instrument operator initiates a scan cycle by depressing the plunger contact of a push button start switch 60. A trigger voltage is thereby applied to an or gate 62 which causes the chart drive circuit 64 to energize a drive mechanism of the chart recorder 24. A trigger voltage is also applied, via a delay circuit 66, to the scanning waveform generator 40 for initiating generation of the trace segment 30. The delay circuit 66 provides a time delay in order to permit the mechanical chart recorder to attain normal operating speed.

In the automatic cycling mode of operation, the swinger arm 58 contacts the terminal R. Depression of the plunger contact of the pushbutton start switch 60 initiates a first scan cycle. The second and successive cycles are initiated by an output signal from the discharge detector 56, via a second delay circuit 68. The delay circuit 68 relays application of the output signal from discharge detector 56 to the or gate 62 until the end-of-scan level detector 52 has effected reapplication of the power to the magnet regulator amplifier via power gate 46.

Figure 4:
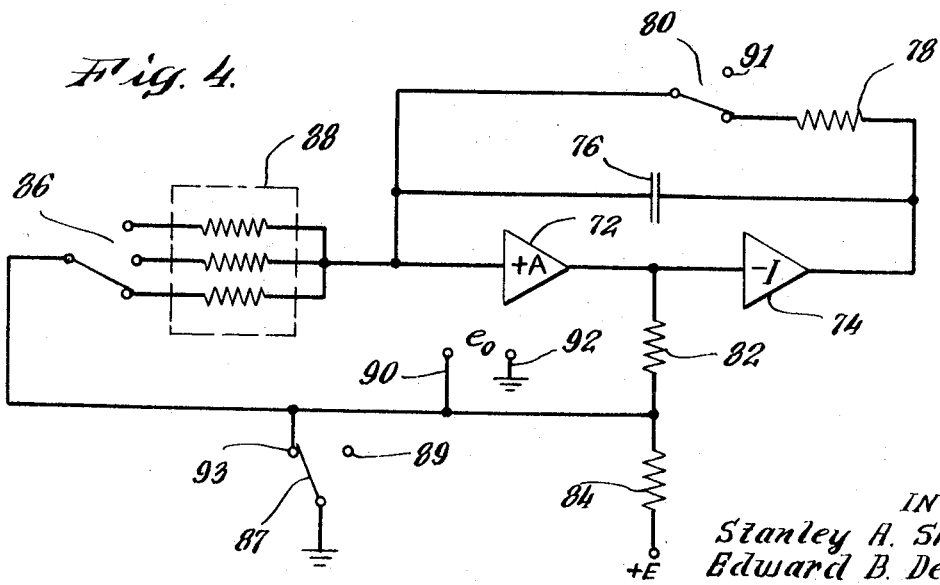
FIG. 4 is a diagram partly in block form illustrating a waveform generator included in the scanning arrangement of FIG. 2.

FIGURE 4 illustrates a waveform generator for generating a scanning current having the desired exponential function $(e^{t/\tau})$ as shown by segment 30 of the waveform in FIG. 3. The amplifier comprises an operational integrating amplifier having an amplifier section 72 of relatively high gain, A. This gain, which is generally on the order of a thousand or greater, is provided by a plurality of stages although the amplifier itself is represented by the single symbol indicated by reference numeral 72. A negative feedback portion of the amplifier includes an amplifier section 74 providing negative feedback to the amplifier 72 via a capacitance 76 and a discharge network including a resistor 78 and switch 80. The amplifier further includes means for providing positive feedback from the output of amplifier section 72 to an input terminal thereof. It can be shown that this circuit arrangement provides an output voltage $e_0$ between terminals 90 and 92 which satisfies the exponential function $(e^{t/\tau}-1)$. A contact 87 of a start switch is shown coupled to the circuit for initiating a trace cycle. This contact and the swinger contact arm 80 are moved to terminals 89 and 91 respectively in order to initiate a scan cycle. The positive feedback is provided by a loop including resistive impedance 82, 84, and 88. As swinger 87 is moved from contact 93, the circuit is trigger to generate the derived function.

In FIG. 5, the magnet regulator amplifier and power gate are illustrated in schematic form. Those components of FIG. 5 described previously bear similar reference numerals. The magnet regulator amplifier 44 is illustrated within the dotted rectangle and is shown to comprise a series regulator circuit having relatively high power handling capabilities. An output from the magnet drive preamplifier 42 having the waveform as illustrated in FIG. 3 by the segment 30 is applied via a Darlington amplifier circuit including the transistors 100 and 102. The output current from the emitter terminal of the transistor circuit 102 is applied to the base of a group of parallel coupled series regulating power transistors 104. The current in the magnet is of relatively high amplitude during the scan interval and corresponds to the segment 30 of the waveform of FIG. 3. As the voltage across the resistor 50 reaches a preselected level, the end-of-scan level detector 52 applies a voltage via amplifying transistor 110 to a plurality of parallel coupled power transistors 108 arranged in series with power transistors 104 to function as a series regulator circuit for the scanning current. During the scanning interval the end-of-scan level detector 52 applies an enabling voltage to the base terminal of these transistors so that they are fully conductive. On attaining the level 34 in the waveform of FIG. 3, for example, or any predetermined level, these transistors are cut off by a voltage and current flow to the magnet is accordingly interrupted. At this time, however, the energy in a magnetic field of the magnet 20 is substantial in view of the relatively high current and relatively high inductance, which may be on the order of 5 amperes and 20 henries, respectively, and must be dissipated. While during the scanning cycle the operating potential for the transistors 104 of the magnet regulator amplifier 44 was provided via the power gate 46, the operating potential is now provided by the voltage developed across the magnet 20 and is of polarity which tends to maintain current flow in the magnet.

During the scan interval, transistor 113 of the power amplifier regulator circuit in coopeartion with preamplifier 42 supplies current to control base current of the Darlington transistors 100 and 102 which in turn control the magnet current via transistor 104. During the occurance of segment 32 of FIG. 3, a Zener diode 114 controls the voltage from the collector to base of transistor 104 thereby maintaining the voltage across the magnet during discharge. Accordingly, current for discharging the magnetic field of the magnet flows in a series circuit including a resistor 50, a ground circuit, a diode 111, and the the transistors 104. Thus, the magnet regulator amplifier functions both as a driver circuit for providing the realtively high scanning current and additionally s a high voltage discharge circuit means for discharging the energy in the field of the magnet.

In FIG. 6, the preamplifying arrangement 42, shown within a dotted area, is illustrated in greater detail. The preamplifier includes a first differential amplifier stage 112 having as input voltages both the exponentially rising scan segment 30 from the add network 48 and a feedback voltage from the resistor 50 for improving the linearity of the amplifier. The first stage 112 provides two outputs which are applied to a second stage 114 and in cascade to an amplifier 116 adapted for providing the desired gain and impedance characteristics. A frequency compensating network 118 for the preamplifier includes resistances 120, 122, and a capacitance 124. In view of the capacitance 124, it may be difficult at the beginning and termination of the retrace interval to discharge the capacitance 124 in a period of time sufficient to allow the amplifier to respond. Accordingly a fast recovery amplifier circuit is provided and includes the PNP and NPN transistors 126 and 128 respectively for discharging this capacitance in accordance with the polarity of the stored charge.

Thus, we have described a scanning circuit arrangement for a mass spectrometer which advantageously provides an improved circuit arrangement for generating a scanning waveform having the desired exponential function ($e^{t/\tau}$), which utilizes a magnet coil driver circuit arrangement for providing both the power amplification and a discharge loop for discharging the energy in a magnetic field of the magnet, and a quick recovery circuit particularly useful for discharging a frequency compensating capacitance.

While we have illustrated and described a specific embodiment of the invention, it will be understood that various modifications may be made therein without departing from the spirit of the invention and the scope of the appended claims.

We claim:
1. In a mass spectrometer, a magnetic scanning circuit arrangement comprising:
  a mass scanning electromagnet having a coil thereof;
  waveform generating means adapted for generating a scanning waveform having an exonential segment of the function ($e^{t/\tau}-1$);
  power amplifying circuit means for causing a current to flow in said electromagnet coil in accordance with said exponential waveform; and
  circuit means for automatically interrupting the flow of power to said power amplifying circiut means when a predetermined current amplitude flows in said coil.

2. The scanning arrangement of claim 1 wherein said electromagnet stores energy in its field when the predetermined level is attained and said power amplifier circuit means is arranged for providing a power discharge path for said energy.

3. In a mass spectrometer, a magnetic scanning circuit arrangement comprising:
  a mass scanning electromagnet having a coil thereof;
  waveform generating means adapted for generating a scanning waveform having an exponential segment of the function ($e^{t/\tau}-1$).

a magnet regulator amplifier circuit arrangement coupled to said coil;
  circuit means for applying said exponential waveform to said magnet regulator circuit;
  a power gate circuit arrangement adapted for interrupting the application of power to said magnet regulator in response to an input voltage; and
  means coupled to said power gate circuit for sensing a predetermined level of current in said coil and for applying a voltage to said power gate circuit for interrupting power flow to said magnet regulator.

4. The scanning circuit arrangement of claim 3 wherein said waveform generating means comprises an amplifier circuit adapted for generating the function $e^{t/\tau}$ and added circuit means coupled to said generating amplifying means for providing a composite signal ($e^{t/\tau}-1$).

5. The scanning circuit arrangement of claim 3 wherein said waveform generating means comprises an operational integrating amplifier having a positive feedback loop.

6. The scanning circuit arrangement of claim 3 wherein said magnet regulator amplifier circuit means comprises a plurality of parallel coupled amplifying devices arranged in a series current regulating configuration and said exponential waveform is applied to a control electrode of said devices.

7. The scanning circuit arrangement of claim 4 wherein said power gate circuit means comprises a plurality of parallel coupled amplifying devices arranged in a series current regulator configuration and said level sensing means is arranged for applying a control voltage to a control electrode of said devices.

8. The scanning circuit arrangement of claim 3 wherein said circuit means for applying an exponential waveform to said magnet regulator circuit includes a preamplifier circuit having an RC frequency compensating network, said preamplifier including an NPN and a PNP transistor amplifying device arranged in a circuit for discharging a capacitor of the RC circuit in response to input signals of opposite polarity.

9. In a mass spectrometer, a magnetic scanning circuit arrangement comprising:
  a mass scanning electromagnet having a coil thereof;
  an operational integrating amplifier including a first and second amplifier and a capacitance, said second amplifier and said capacitance providing negative feedback for said first amplifier and an impedance network providing positive feedback for said first amplifier;
  an adder circuit arrangement,
  means coupling an input signal from said integrating amplifier to said adder circuit,
  a magnet coil drive preamplifier having an RC frequency compensation network and NPN and PNP transistor amplifying device arranged in a discharge network for a capacitance of said RC compensation network;
  means for applying an output signal from said adder circuit to said preamplifier circuit;
  a magnet regulator amplifier comprising a plurality of parallel coupled amplifying devices having control elements and coupled in a series current regulating configuration with said magnet coil;
  means for coupling an output signal from said preamplifier to said central electrodes;
  a power gate circuit for providing operating potential for said magnet regulator amplifier comprising a plurality of parallel coupled amplifying devices having control electrodes and arranged in a series current regulating circuit configuration with said magnet regulator amplifier;
  circuit means for sensing a predetermined level of magnet current and for generating a control signal; and means for coupling said control signal to the control electrodes of said power gate circuit.

References Cited

UNITED STATES PATENTS

| | | |
|---|---|---|
| 2,378,936 | 6/1945 | Langmuir. |
| 2,672,559 | 3/1954 | Goodwin. |
| 3,070,727 | 12/1962 | Birt _____ 307—228 |
| 3,047,820 | 7/1962 | Lawton _____ 307—228 |
| 3,405,286 | 10/1968 | Mudie _____ 307—228 |
| 3,416,073 | 12/1968 | Gutow. |

RALPH G. NILSON, Primary Examiner

C. E. CHURCH, Assistant Examiner

UNITED STATES PATENT OFFICE

CERTIFICATE OF CORRECTION

Patent No. 3,515,869　　　　　　　　　　Issued June 2, 1970

It is certified that error appears in the above-identified patent and that said Letters Patent are hereby corrected as shown below:

a) At column 6, line 65 (Claim 9) the expression "central electrodes" is corrected to read --control elements--.

b) At column 5, line 55, "exonential" is corrected to read --exponential--.

SIGNED AND
SEALED
OCT 6 - 1970

OCT. 6, 1970

(SEAL)
Attest:

Edward M. Fletcher, Jr.
Attesting Officer

WILLIAM E. SCHUYLER, JR.
Commissioner of Patents